(12) United States Patent
Bhatia et al.

(10) Patent No.: US 8,589,593 B2
(45) Date of Patent: Nov. 19, 2013

(54) METHOD AND APPARATUS FOR PROCESSING PROTOCOL MESSAGES FOR MULTIPLE PROTOCOL INSTANCES

(75) Inventors: Jagjeet Bhatia, Newbury Park, CA (US); Jeremy Touve, Valencia, CA (US)

(73) Assignee: Alcatel Lucent, Paris (FR)

( * ) Notice: Subject to any disclaimer, the term of this patent is extended or adjusted under 35 U.S.C. 154(b) by 966 days.

(21) Appl. No.: 12/368,432

(22) Filed: Feb. 10, 2009

(65) Prior Publication Data
US 2010/0205612 A1 Aug. 12, 2010

(51) Int. Cl.
*G06F 15/16* (2006.01)

(52) U.S. Cl.
USPC .......................................................... 709/250

(58) Field of Classification Search
USPC .................................................. 709/225, 250
See application file for complete search history.

(56) References Cited

U.S. PATENT DOCUMENTS

| | | | | |
|---|---|---|---|---|
| 2002/0161848 A1* | 10/2002 | Willman et al. | ............... | 709/213 |
| 2005/0120122 A1* | 6/2005 | Farnham | ....................... | 709/230 |
| 2006/0161920 A1* | 7/2006 | An et al. | ........................ | 718/102 |
| 2006/0221978 A1* | 10/2006 | Venkatachalam | ........ | 370/395.41 |
| 2008/0115147 A1* | 5/2008 | Ding | .............................. | 719/314 |
| 2008/0244098 A1* | 10/2008 | Oikawa et al. | .................... | 710/5 |
| 2008/0298261 A1* | 12/2008 | Rittmeyer et al. | ............ | 370/250 |
| 2010/0082854 A1* | 4/2010 | Rossen et al. | ................... | 710/39 |

* cited by examiner

*Primary Examiner* — Jason Recek
(74) *Attorney, Agent, or Firm* — Wall & Tong, LLP

(57) ABSTRACT

The invention includes a method and apparatus for processing protocol messages for multiple protocol instances. In one embodiment, a method for processing protocol messages includes receiving a plurality of messages for a plurality of processors where each received message is associated with one of the protocol instances, generating a processing request for each message, queuing the processing requests, and servicing the queues in a manner for arbitrating access by the queues to the processors for processing the messages. A processing request generated for a received message identifies one of the protocol instances with which the message is associated. The processing requests are queued using a plurality of queues associated with the respective plurality of protocol instances, where each processing request is queued in one of the queues associated with the one of the protocol instances with which the processing request is associated. The servicing of each queue includes reading a processing request from the queue, if the queue has at least one processing request queued therein, and causing the one of the processors with which the processing request is associated to process one of the messages associated with the protocol instance identified by the processing request. The queues may be serviced in a round-robin manner for arbitrating access by the queues to the processors, thereby enabling atomic processing of the messages.

21 Claims, 6 Drawing Sheets

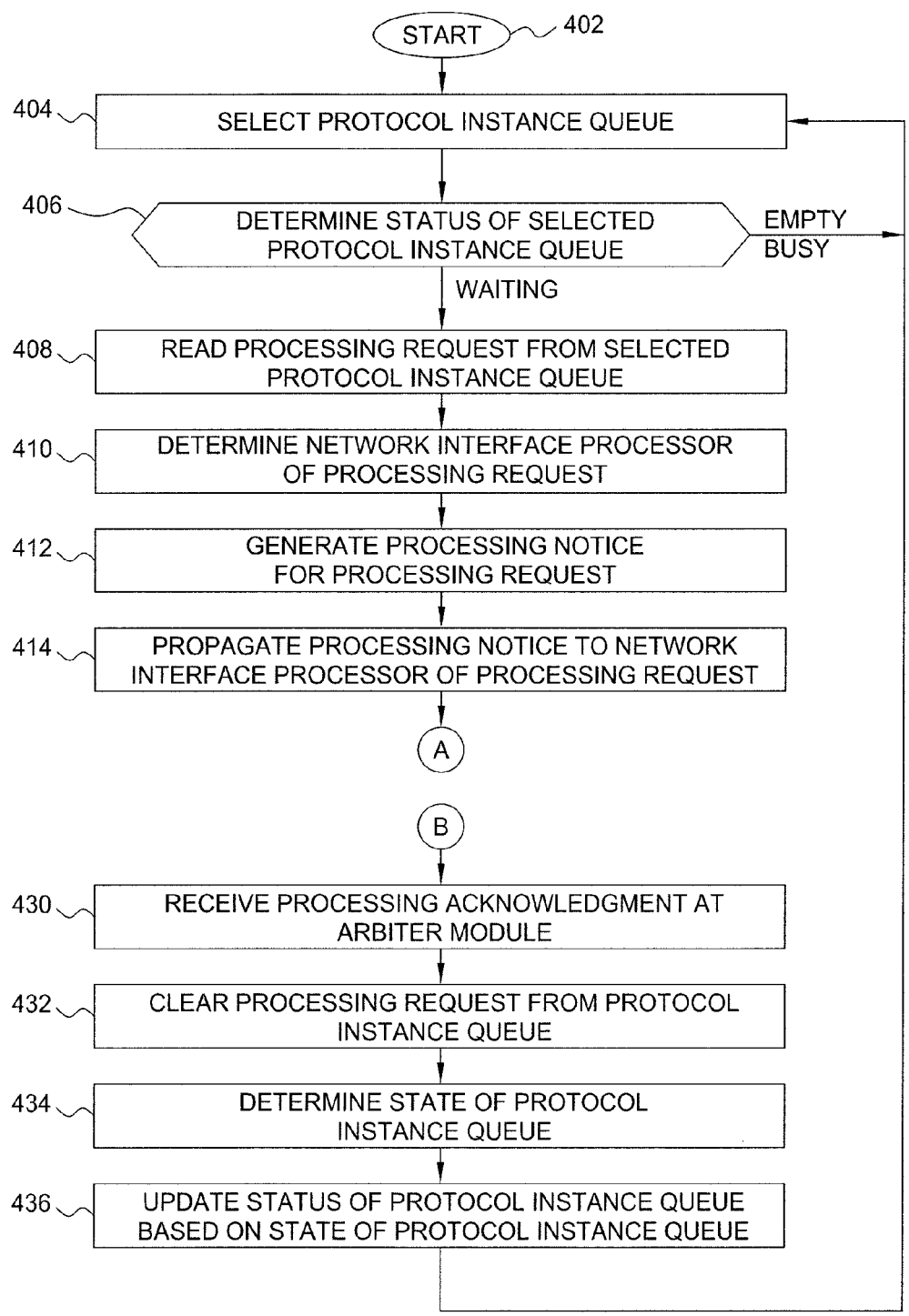
FIG. 4A 400
PROCESSING BY AM
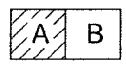

METHOD AND APPARATUS FOR PROCESSING PROTOCOL MESSAGES FOR MULTIPLE PROTOCOL INSTANCES

FIELD OF THE INVENTION

The invention relates to the field of communication networks and, more specifically, to processing protocol messages at a communication node of a communication network.

BACKGROUND OF THE INVENTION

In many communications networks, multiple instances of a protocol may be running simultaneously, e.g., to support different groups of end users accessing the network, to provide different functions and services within the network, and the like. One example of such a protocol is the Spanning Tree Protocol (STP). The STP is an Open Systems Interconnection (OSI) layer-2 protocol that ensures a loop-free topology for any bridged Local Area Network (LAN). The STP creates a spanning tree within a mesh network of connected layer-2 bridges, and disables those links that are not part of the spanning tree, leaving a single active path between any two bridges.

In existing implementations of STP, the STP requires a complete view of all ports of each bridge of the network in order to make decisions when a new, possibly topology changing, event occurs. The STP communicates events using protocol messages referred to as Bridge Protocol Data Units (BPDUs). The STP further requires that each decision made by the STP be atomic, i.e., the STP must process each BPDU in order. In other words, each decision that the STP makes while processing one BPDU must be completed before the next BPDU is processed.

In existing networks using STP, the STP may attempt to distribute the STP across multiple network interfaces (NIs) of a system. The STP may attempt to distribute the STP across multiple NIs of a system by using a scheme in which there is a distribution capability between NIs of the system and, further, in which each of the NIs obtains a view of the rest of the system. Disadvantageously, however, such schemes cannot guarantee atomic order in processing of BDPUs being exchanged within the system and, therefore, undesirable situations typically occur.

SUMMARY OF THE INVENTION

Various deficiencies in the prior art are addressed through a method and apparatus for processing protocol messages for multiple protocol instances. In one embodiment, a method for processing protocol messages includes receiving a plurality of messages for a plurality of processors where each received message is associated with one of the protocol instances, generating a processing request for each message, queuing the processing requests, and servicing the queues in a manner for arbitrating access by the queues to the processors for processing the messages. A processing request generated for a received message identifies one of the protocol instances with which the message is associated. The processing requests are queued using a plurality of queues associated with the respective plurality of protocol instances, where each processing request is queued in one of the queues associated with the one of the protocol instances with which the processing request is associated. The servicing of each queue includes reading a processing request from the queue, if the queue has at least one processing request queued therein, and causing the one of the processors with which the processing request is associated to process one of the messages associated with the protocol instance identified by the processing request. The queues may be serviced in a round-robin manner for arbitrating access by the queues to the processors, thereby enabling atomic processing of the messages.

BRIEF DESCRIPTION OF THE DRAWINGS

The teachings of the present invention can be readily understood by considering the following detailed description in conjunction with the accompanying drawings, in which:

FIGS. 4A and 4B depict one embodiment of a method for servicing protocol instance queues to control processing of protocol messages by network interface processors.

To facilitate understanding, identical reference numerals have been used, where possible, to designate identical elements that are common to the figures.

DETAILED DESCRIPTION OF THE INVENTION

The protocol message processing functions depicted and described herein enable processing of protocol messages for a protocol running multiple protocol instances. The protocol message processing functions depicted and described herein arbitrate access by protocol instances to multiple processors, thereby enabling a protocol to be distributed across multiple processors while continuing to operate as a single processor system. The protocol message processing functions depicted and described herein enable atomic processing of protocol messages for the protocol instances, thereby ensuring fair and efficient processing of protocol messages for the protocol instances.

Figure 1:
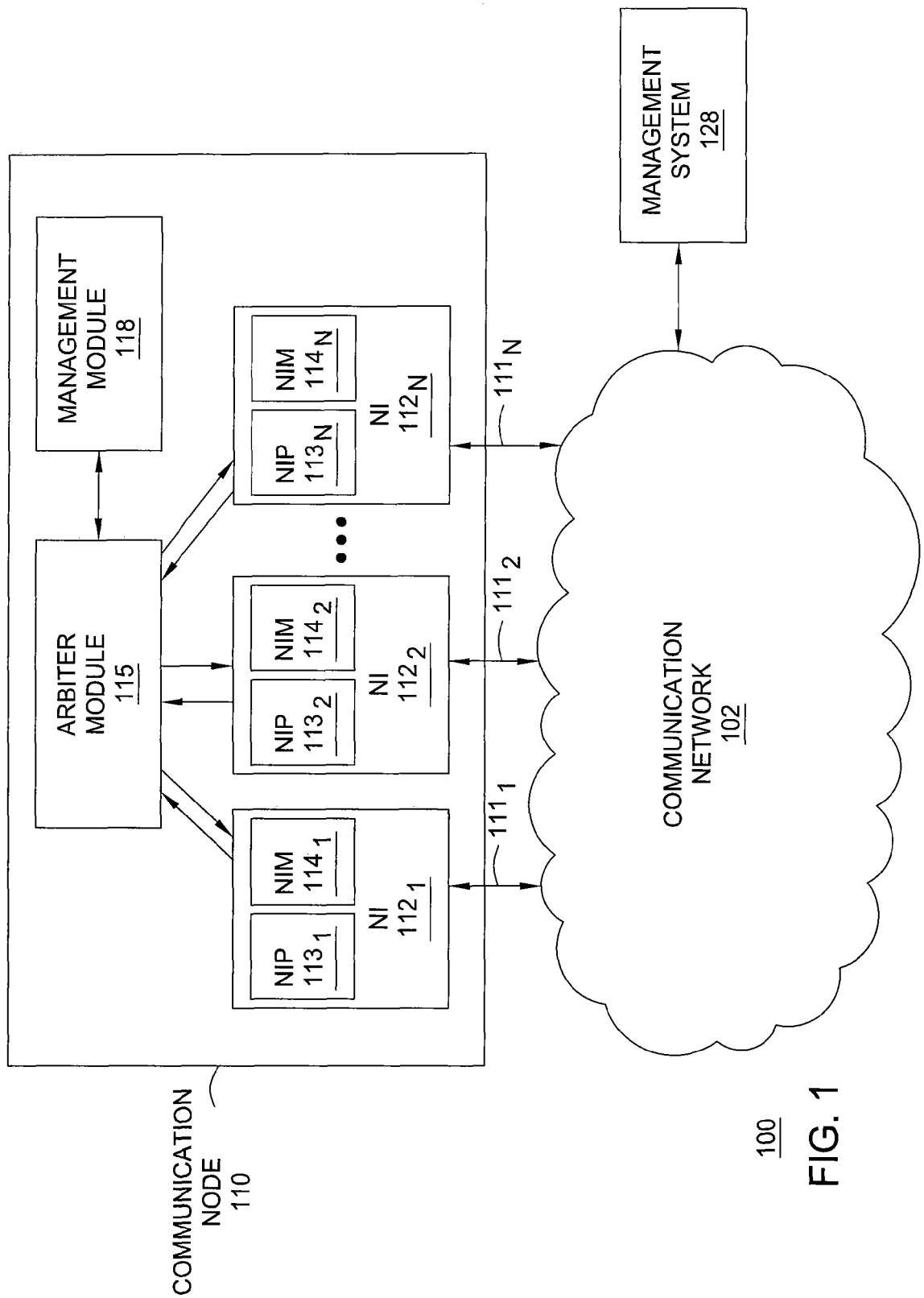
FIG. 1 depicts a high-level block diagram of a communication network architecture including a communication node adapted for processing protocol messages for a plurality of protocol instances.

FIG. 1 depicts a high-level block diagram of a communication network architecture including a communication node adapted for processing protocol messages for a plurality of protocol instances. Specifically, communication network architecture 100 includes a communication network 102 supporting communications for a communication node 110.

The communication network 102 may be any type of communication network supporting a protocol(s) utilizing protocol messages adapted for being processed using protocol message processing functions depicted and described herein. The communication network 102 is adapted for supporting multiple instances of a protocol, where multiple instances of a protocol may be running within communication network 102 for many different reasons (e.g., to support different groups of end users accessing the network, provide different functions and services within the network, and the like, as well as various combinations thereof).

In one embodiment, for example, communication network 102 may be an OSI layer-2 network running multiple instances of a Spanning Tree Protocol (STP). In one embodiment, for example, communication network 102 may be a packet-switched routing network running multiple instances of an Interior Gateway Protocol (IGP). The communication network 102 may be any other suitable communication network capable of running multiple instances of a protocol that exchanges messages which may be processed using the protocol message processing functions depicted and described herein.

Although omitted herein for purposes of clarity, it will be appreciated that the communication network 102 may include any underlying technologies which may facilitate communications for protocols utilizing protocol messages adapted for being processed using the protocol message processing functions depicted and described herein. For example, protocol messages may be transported using optical communication capabilities, wireless communication capabilities, and the like, as well as various combinations thereof.

The communication node 110 may be any type of communication node capable of supporting communications within communication network 102. For example, where communication network 102 is an OSI layer-2 network supporting multiple instances of STP, communication node 110 is a bridge. For example, where communication network 102 is a packet-switched routing network supporting multiple instances of an IGP, communication node 110 is a router. The communication node 110 may be any suitable communication node.

As depicted in FIG. 1, communication node 110 includes a plurality of network interfaces (NIs) $112_1$-$112_N$ (collectively, NIs 112). The NIs $112_1$-$112_N$ include a plurality of network interface processors (NIPs) $113_1$-$113_N$ (collectively, NIPs 113), respectively. The NIs $112_1$-$112_N$ include a plurality of network interface memories (NIMs) $114_1$-$114_N$ (collectively, NIMs 114), respectively. The communication node 110 further includes an arbiter module (AM) 115.

The NIs 112 interface with communication network 102. The NIs $112_1$-$112_N$ interface with the communication network 102 via a plurality of communication links (CLs) $111_1$-$111_N$ (collectively, CLs 111), respectively. The NIs 112 may transmit and receive information, including protocol messages and user data, via one or more ports on each of the NIs 112 (i.e., ports to which the CLs 111 are connected). The NIs 112 enable communication node 110 to communicate with other communication nodes of communication network 102 or with other nodes reachable via communication network 102 (omitted for purposes of clarity).

The NIPs 113 are processors adapted for processing communications for NIs 112, respectively. The NIPs 113 are adapted for processing protocol messages for communication node 110. The NIPs 113 may perform any type of processing of protocol messages, which may vary depending on the type of protocol for which protocol messages are processed. The NIPs 113 also may perform other processing functions for NIs 112 and, more generally, for the communication node 110. The NIPs 113 may be any type of processors. For example, each of the NIPs 113 may be a central processing unit (CPU) or any other suitable processor.

The NIMs 114 are memory components adapted for storing protocol messages received at NIs 112, respectively. The NIMs 114 may store the protocol messages in any suitable manner.

In one embodiment, each NIM 114 includes a message queue for each protocol instance (i.e., each NIM 114 includes M separate message queues associated with M protocol instances being supported). In this embodiment, each message queue on each NIM 114 may be operated as a first-in-first-out (FIFO) queue such that, for each protocol instance, protocol messages are processed at each NI 112 in the order in which those protocol messages are received at the NI 112. In this embodiment, the message queues on each NIM 114 may be controlled in any suitable manner (e.g., in a manner similar to the management of protocol instance queues maintained by AM 115, as depicted and described with respect to FIG. 2.

In one embodiment, each NIM may store protocol messages using protocol instance identifiers and timestamps such that, for each protocol instance, protocol messages are processed at each NI 112 in the order in which those protocol messages are received at the NI 112.

The NIMs 114 may store the protocol messages in any other suitable manner.

The NIPs 113 are each adapted for providing protocol message processing functions depicted and described herein. The NIPs 113 receive protocol messages. The NIPs 113 receive the protocol messages via respective NIs 112. The NIPs 113 store the protocol messages in NIMs 114, respectively, for later processing by NIPs 113. As described herein, each NIP 113 stores the protocol messages in the respective message queues of the NIP 113 based on the protocol instances with which the protocol messages are associated. The NIPs 113 generate processing requests for the protocol messages, respectively. The NIPs 113 propagate the processing requests to the AM 115.

The AM 115 is adapted for providing protocol message processing functions depicted and described herein. The AM 115 maintains a plurality of queues for the plurality of protocol instances supported by the communication network 102 (denoted herein as protocol instance queues). The AM 115 receives processing requests from NIPs 113 and queues processing requests in protocol instance queues maintained for the protocol instances. The AM 115 services the protocol instance queues, arbitrating access by the protocol instance queues to NIPs 113 such that, for each of the protocol instances, the protocol messages of that protocol instance may be processed in the proper order.

Figure 2:
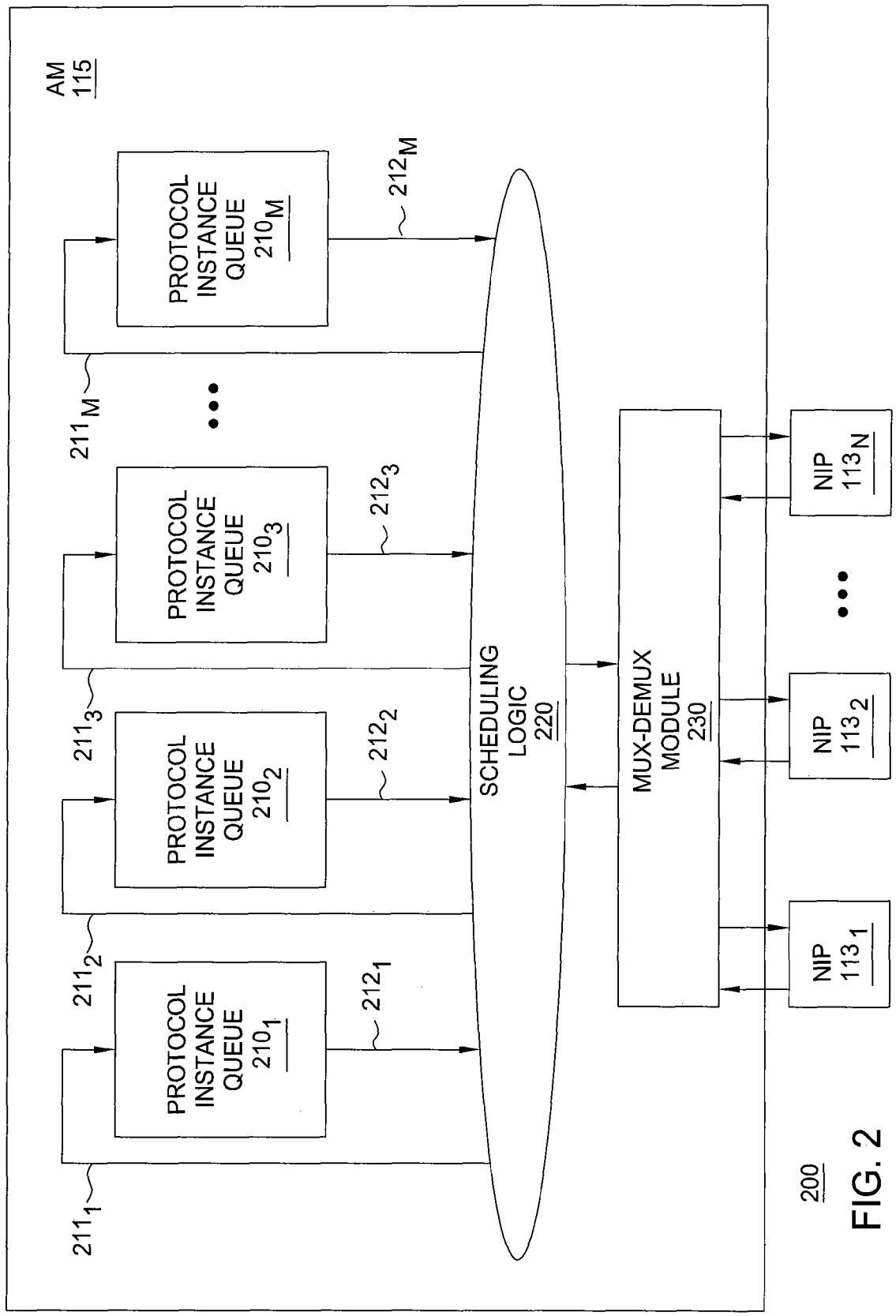
FIG. 2 depicts the communication node of FIG. 1, illustrating operation of the arbiter module for processing of the protocol messages for a plurality of protocol instances.

The operation of the NIs 112 and the AM 115 in providing the protocol message processing functions depicted and described herein may be better understood with respect to FIG. 2.

The NIs 112 are communicatively coupled to AM 115. For example, NIs 112 may communicate with AM 115 via one or more communication buses (e.g., via a backplane to which each of the modules is connected, via direct connections between the modules, and the like, as well as various combinations thereof). For example, NIs 112 may communicate with AM 115 via one of more network connections (e.g., where communication node 110 is implemented in a physically distributed manner). The NIs 112 and AM 115 may be communicatively coupled in any other suitable manner (which may depend on the type of communication node, the system architecture with which the communication node is implemented, the protocol being that is being supported, and like factors, as well as various combinations thereof).

The communication node 110 may be implemented using any suitable system architecture. The system architecture of communication node 110 that is depicted in FIG. 1 is merely illustrative of logical associations (and, possibly, physical connections) between the components of communication node 110 and, thus, it will be appreciated that communication node 110 may be physically implemented in other ways.

In one embodiment, for example, each of the NIs 112 is implemented as a separate line card (having one or more ports and, thus, one or more communication lines coupled thereto) installed in a shelf of communication node 110, and the AM 115 is implemented as part of a control card installed in the same shelf of the communication node 110.

In one embodiment, for example, each of the NIs 112 is implemented as a separate line card (having one or more ports and, thus, one or more communication lines coupled thereto), and the AM 115 is implemented on one of the NIs 112.

In one embodiment, for example, each of the NIs 112 is a separate line card (having one or more ports and, thus, one or more communication lines coupled thereto), however, the NIPs 113 supporting NIs 112 are not implemented on the respective NIs 112 (e.g., NIPs 113 may be disposed on one or more processor cards that are in communication with, but physically separate from, the NIs 112).

As such, it will be appreciated by those skilled in the art that the system architecture of communication node 110 may be implemented in various other ways. In other words, the NIs 112, the NIPs 113, and the AM 115 may be physically implemented within a communication node and/or physically distributed across multiple communication nodes in any suitable manner, which may depend on the type of communication node (e.g., bridge, router, and the like), the protocol being supported, and like factors, as well as various combinations thereof.

As depicted in FIG. 1, NIMs 112 and/or AM 115 may be controlled locally and/or remotely.

In one embodiment, NIMs 112 and/or AM 115 are controlled locally by a management module 118 implemented within the communication node 110.

In one embodiment, NIMs 112 and/or AM 115 are controlled remotely by a management system 128 in communication with the communication node 110 (e.g., via communication network 102 or some other network). The management system 128 may be a management system dedicated for managing NIMs 112 and/or AM 115 (as well as other arbiter modules that are operating on other communication nodes of the network). The management system 128 may be an existing management system having management capabilities for managing NIMs 112 and/or AM 115, as well as other similar modules in other communication nodes of communication network 110 (e.g., an Element Management System (EMS), a Network Management System (NMS), or another Operations Support System (OSS) providing management functions within communication network 110).

The management of NIMs 112 may include performing management functions such as creating/terminating message queues within each of the NIMs 112 as protocol instances are created/terminated within communication node 110 and/or as network interfaces are added to and removed from the communication node 110, modifying settings of existing message queues, and like management functions, as well as various combinations thereof. The management of NIMs 112 may include various other management functions.

The management of AM 115 may include performing management functions such as creating/terminating protocol instance queues within AM 115 as protocol instances are created/terminated within communication node 110 and/or as network interfaces are added to and removed from the communication node 110, modifying settings of existing protocol instance queues, and like management functions, as well as various combinations thereof. The management of AM 115 may include various other management functions.

FIG. 2 depicts the communication node of FIG. 1, illustrating operation of the arbiter module for processing of the protocol messages for a plurality of protocol instances. As depicted in FIG. 2, communication node 110 includes NIPs 113 and AM 115 (note that the NIs 112 are omitted from FIG. 2 for purposes of clarity).

As depicted in FIG. 2, AM 115 includes a plurality of protocol instance queues (PIQs) $210_1$-$210_M$ (collectively, PIQs 210), scheduling logic (SL) 220, and a multiplexer-demultiplexer module (MDM) 230.

The PIQs 210 are associated with respective protocol instances of a protocol operating on communication node 110. The PIQs 210 are adapted for use in processing protocol messages for the multiple protocol instances of the protocol operating communication node 110.

As depicted in FIG. 2, PIQs 210 include M queues over which AM 115 arbitrates the running of multiple processors available for processing protocol messages of multiple protocol instances of a protocol (illustratively, NIPs 113). For example, for a given protocol operating on communication node 110, PIQ $210_1$ is associated with a first instance of the protocol, PIQ $210_2$ is associated with a second instance of the protocol, and so forth. The PIQs 210 each have a protocol instance identifier (e.g., PIQ-ID) associated therewith.

As depicted in FIG. 2, PIQs 210 include M queues over which AM 115 arbitrates the running of N NIPs available for processing protocol messages of multiple instances of a protocol operating on a network. The PIQ:NIP ratio (i.e., M:N ratio) may be set in any suitable manner, which may depend on one or more factors, such as the number of protocol instances to be managed within a protocol, the intensiveness of processing protocol messages for the protocol, and like factors. For example, 256 PIQs may be instantiated for AM 115, over which AM 115 may arbitrate the running of 12 NIPs. For example, 128 PIQs may be instantiated for AM 115, over which AM 115 may arbitrate the running of 4 NIPs. The communication node 110 may be implemented and managed such that the M:N ratio may be set in any suitable manner.

In other words, although primarily depicted and described herein with respect to specific numbers of NIPs, specific numbers of PIQs, and specific ratios of PIQs to NIPs, it will be appreciated by those skilled in the art that the protocol message processing functions may be implemented using different numbers of NIPs, different numbers of PIQs, and/or different ratios of PIQs to NIPs.

The PIQs 210 are queues adapted for facilitating processing of protocol messages for multiple protocol instances by queuing processing requests that are associated with the processing messages (i.e., processing requests that are generated by NIPs 113 and propagated to AM 115 as protocol messages are received at NIs 112, respectively).

The PIQs 210 may be operated in any manner suitable for providing atomic processing of protocol messages of different protocol instances of a protocol. In one embodiment, each of the PIQs 210 is operated as a first-in-first-out (FIFO) queue to ensure first-come-first-served (FCFS) arbitration of protocol messages. The PIQs 210 operate independently from each other for independently processing protocol messages of different protocol instances of the protocol.

The SL 220 provides scheduler logic adapted for controlling interaction between PIQs 210 and NIPs 113.

The SL 220 receives processing requests from NIPs 113, and assigns each processing request to an appropriate one of the PIQs 210 associated with the received processing request (i.e., based on the protocol instance with which the processing request is associated).

The SL 220 services PIQs 210 in a manner for fairly and efficiently enabling PIQs 210 to utilize NIPs 113 for processing protocol messages of different protocol instances. The SL 220 may service the PIQs 210 in any suitable manner (e.g., using a round-robin scheme or any other scheme that is suitable for cycling through the PIQs to enable atomic servicing of protocol messages associated with the protocol instances of the PIQs).

The PIQs 210 and SL 220 may queue processing requests in any suitable manner.

In one embodiment, the PIQs 210 and SL 220 control queuing and servicing of the processing requests using write pointers and read pointers.

The SL 220 writes processing requests for protocol messages to the PIQs 210 as the processing requests are received at AM 115 from NIPs 113. This is depicted in FIG. 2 as write pointers $211_1$-$211_M$ associated with PIQs $210_1$-$210_M$, which write processing requests into the back of the PIQs $210_1$-$210_M$, respectively, depending on the protocol instances of the processing requests.

The SL 220 reads processing requests for protocol messages from PIQs 210 as PIQs 210 are selected by AM 115 to enable protocol messages to be serviced by NIPs 113. This is depicted in FIG. 2 as read pointers $212_1$-$212_M$ associated with PIQs $212_1$-$212_M$, which read processing requests from the front of the PIQs $212_1$-$212_M$, respectively, as the PIQs 210 are serviced by SL 220.

Although primary depicted and described with respect to embodiments in which PIQs 210 and SL 220 control queuing and servicing of processing requests using write pointers and read pointers, it will be appreciated that queuing and servicing of processing requests may be controlled in any other suitable manner.

The MDM 230 is a multiplexer-demultiplexer (MUX-DEMUX) supporting communications between components of communication node 110.

The MDM 230 facilitates communications between PIQs 210 and NIPs 113 in support of scheduling logic that is executed by SL 220. The MDM 230 propagates processing requests from NIPs 113 to appropriate ones of PIQs 210. The MDM 230 propagates processing notices from AM 115 to ones of the NIPs 113 used to process protocol messages in response to processing notices.

The MDM 230 may facilitate other communications for communication node 110. For example, MDM 230 may facilitate inter-NIP communications between NIPs 113, communications between NIPs 113 and other hardware components of communication node 110, and the like, as well as various combinations thereof.

Figure 3:
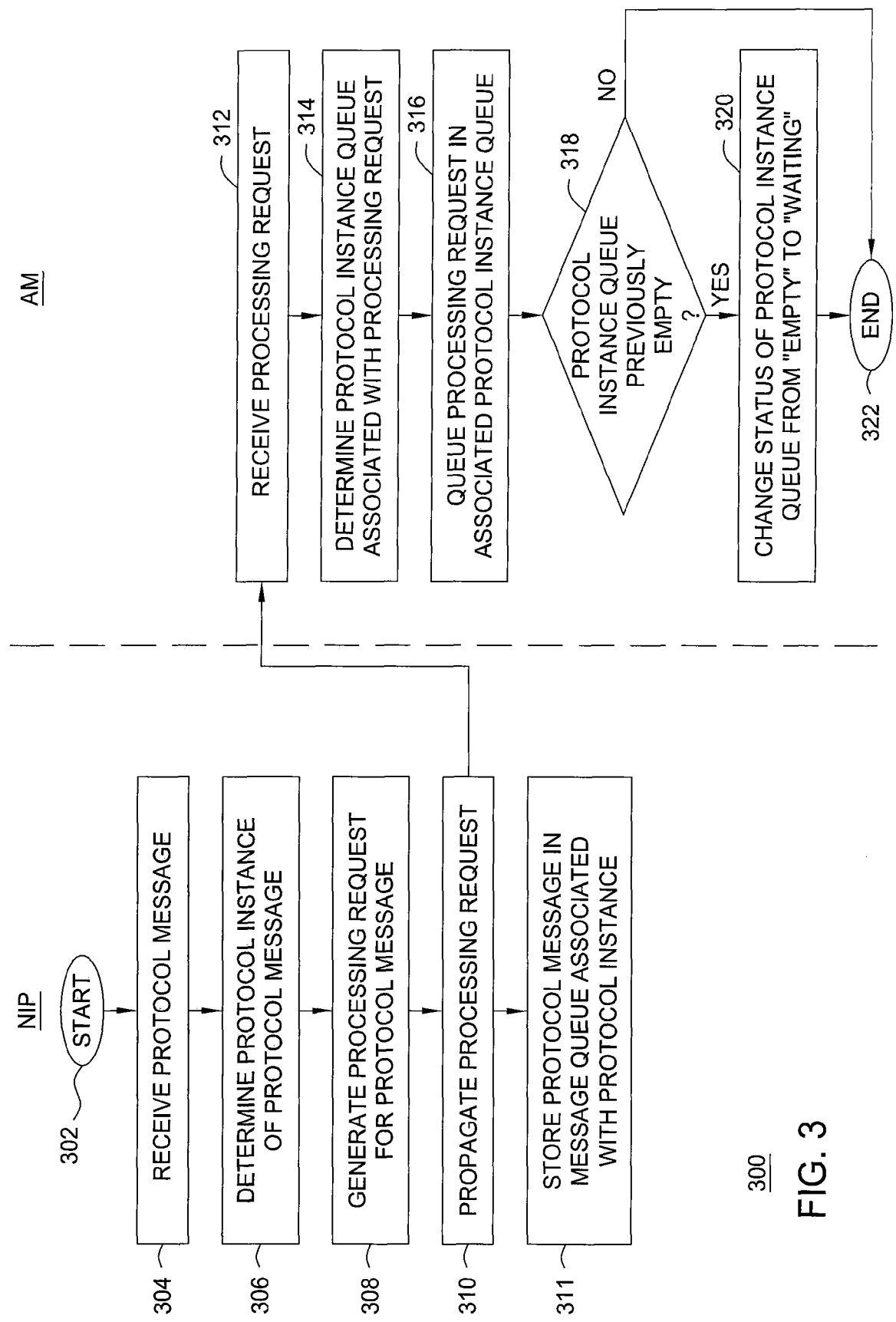
FIG. 3 depicts one embodiment of a method for queuing processing requests for incoming protocol messages using protocol instance queues.
Figure 4B:
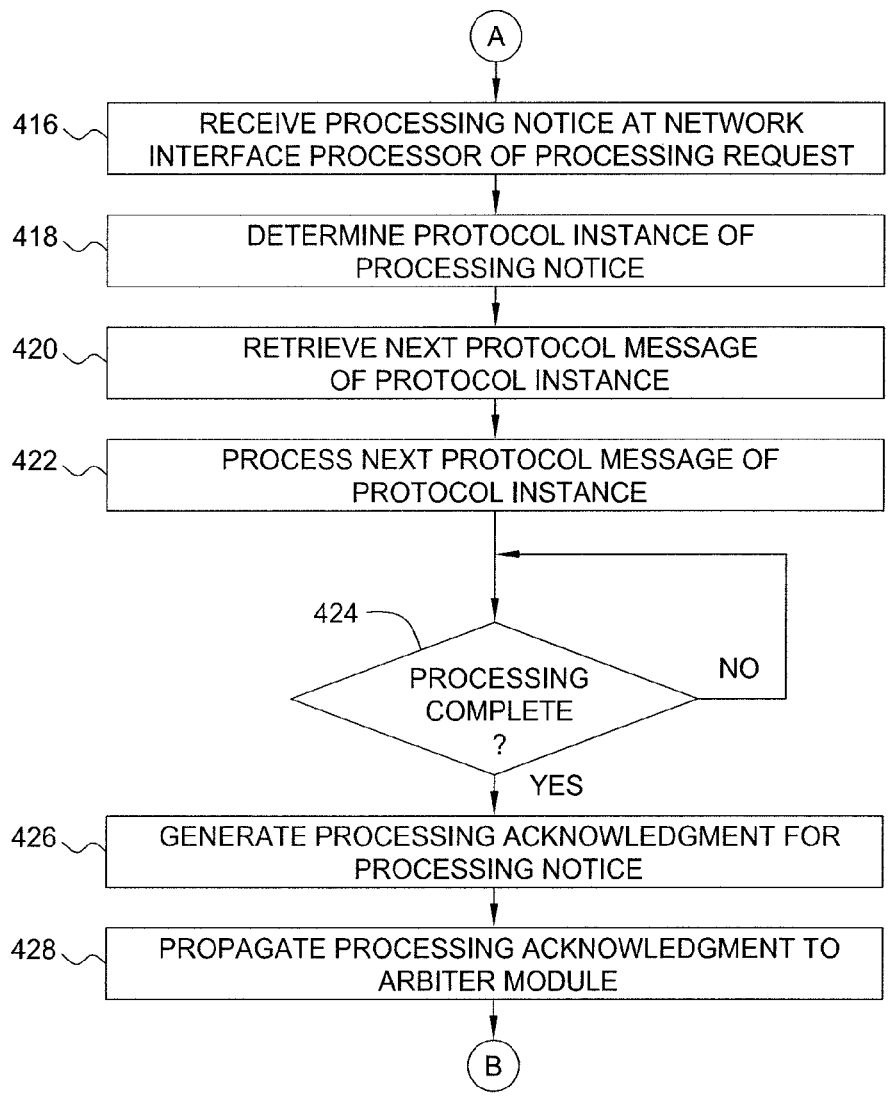

The operation of NIPs 113 and AM 115 in providing protocol message processing functions is depicted and described herein with respect to FIG. 3 and FIGS. 4A and 4B.

FIG. 3 depicts one embodiment of a method for queuing processing requests for incoming protocol messages using protocol instance queues. More specifically, FIG. 3 depicts interaction between a network interface processor and an arbiter module in queuing processing requests for incoming protocol messages using protocol instance queues associated with respective instances of a protocol. Although depicted and described herein as being performed serially, at least a portion of the steps of method 300 may be performed contemporaneously, or in a different order than depicted and described with respect to FIG. 3. The method 300 begins at step 302 and proceeds to step 304.

At step 304, the NIP receives a protocol message. The protocol message is received at a NI associated with the NIP. The protocol message is associated with one of the protocol instances.

At step 306, the NIP determines the protocol instance with which the protocol message is associated. The protocol instance with which the protocol message is associated may be determined based on information included within the protocol message, the port on which the protocol message is received, and the like, as well as various combinations thereof.

At step 308, the NIP generates a processing request. The processing request includes information identifying: (1) the protocol instance of the received protocol message (e.g., a protocol instance identifier, PIQ-ID), and (2) the NIP that received the protocol message (e.g., a processor identifier, CPU-ID). The processing request may include other suitable information.

At step 310, the NIP propagates a processing request to the AM. The NIP may propagate the processing request to the AM in any suitable manner.

At step 311, the NIP stores the protocol message in a message queue on the NI. The NIP stores the protocol message in memory until the protocol message is to be processed. The NIP may store the protocol message in the associated NIM in any suitable manner. For example, where the NIM includes message queues for the protocol instances, the protocol message may be written into the back of the message queue that is associated with the protocol instance of the protocol message. For example, where the NIM does not include message queues for the protocol instances, the protocol message may be stored using an identifier of the associated protocol instance and a timestamp. The NIP may store the protocol message in any other suitable manner.

At step 312, the AM receives the processing request from the NIP. In one embodiment, the AM buffers the processing request until scheduling logic of the AM can process the processing request.

At step 314, the AM determines which of the multiple PIQs in which the processing request should be queued. The AM determines the appropriate PIQ based on the PIQ-ID included within the processing request and the PIQ-IDs associated with the respective PIQs of the AM. For example, the AM may determine the appropriate PIQ in which the processing request should be queued by comparing the PIQ-ID of the protocol request to the PIQ-IDs of each of the respective PIQs until a match is found.

At step 316, the AM queues the processing request. The AM queues the processing request in the determined one of the PIQs. The AM may store all of the information of the processing request or a subset of the information of the processing request (e.g., storing the CPU-ID but not the PIQ-ID since the PIQ-ID can be determined later from the PIQ-ID assigned to the PIQ). The AM also may store information not included in the processing request, where appropriate.

The AM may queue the processing request in the determined one of the PIQs in any suitable manner.

In one embodiment, the AM queues the processing request by writing the processing request into a current write pointer of the determined one of the PIQs that is associated with the processing request. In one embodiment, in which the PIQs are implemented as FIFO queues, the current write pointer is the last write pointer in the PIQ. The AM may increment the write pointer for the PIQ either before or after writing the processing request (depending on the implementation).

At step 318, a determination is made as to whether the determined one of the PIQs was empty before the processing request was queued therein. If the PIQ was non-empty before the processing request was queued in that PIQ, method 300 proceeds to step 320. If the PIQ was empty before the processing request was queued in that PIQ, method 300 proceeds to step 322.

At step 320, the AM changes the status of the PIQ from EMPTY (which will cause that PIQ to be skipped during servicing of the PIQs) to WAITING (which will cause that PIQ to be serviced during servicing of the PIQs, rather than skipping that PIQ as being an empty PIQ that does not have any protocol messages that need to be processed). From step 320, method 300 proceeds to step 322.

At step 322, method 300 ends.

Although depicted and described as ending (for purposes of clarity), in one embodiment the AM may acknowledge the processing request to the NIP from which the processing request was received (if necessary or desired). The AM may acknowledge the processing request, to the NIP from which the process request was received, in any suitable manner.

As described herein, FIG. 3 depicts interaction between a NIP and the AM when a protocol message is received at the NIP. Thus, since protocol messages may be received by any of the NIPs in a communication node, it will be appreciated that method 300 of FIG. 3 may be executed by multiple different NIPs interacting with the AM as protocol messages are received at the different NIPs.

FIGS. 4A and 4B depict one embodiment of a method for servicing protocol instance queues to control processing of protocol messages by network interface processors. More specifically, FIGS. 4A and 4B depict interaction between network interface processors and an arbiter module in servicing protocol instance queues to control processing of protocol messages by the network interface processors. Although depicted and described herein as being performed serially, at least a portion of the steps of method 400 may be performed contemporaneously, or in a different order than depicted and described with respect to FIGS. 4A and 4B. The method 400 begins at step 402 and proceeds to step 404.

At step 404, one of the PIQs is selected. The first PIQ that is selected may be selected in any manner. The PIQs may be serviced in any order. In one embodiment, for example, the PIQs may be serviced in a round-robin fashion.

At step 406, the status of the selected PIQ is determined. The status may be EMPTY, BUSY, or WAITING.

If the status of the PIQ is EMPTY, the PIQ does not have any pending processing requests and, thus, that PIQ is skipped. In this case, method 400 proceeds to step 404, at which point the next PIQ to be serviced is selected. From step 404, method 400 proceeds to step 406.

If the status of the PIQ is BUSY, the PIQ does have at least one pending processing request, but the PIQ is currently utilizing one of the NIPs to process a protocol message and, thus, that PIQ is skipped (i.e., no PIQ can utilize more than one NIP at any given time). In this case, method 400 proceeds to step 404, at which point the next PIQ to be serviced is selected. From step 404, method 400 proceeds to step 406.

If the status of the PIQ is WAITING, the PIQ does have at least one pending processing request, the PIQ is not currently utilizing any of the NIPs to process a protocol message and, thus, that PIQ is ready and will be serviced to enable a protocol message to be processed for that protocol instance. In this case, method 400 proceeds to step 408.

At step 408, the AM reads a processing request from the selected PIQ.

As described with respect to queuing of processing requests, the AM may store all of the information of the processing request or a subset of the information of the processing request (e.g., storing the CPU-ID but not the PIQ-ID since the PIQ-ID can be determined later from the PIQ-ID assigned to the PIQ) and, optionally, may store other information where appropriate. Thus, the processing request read from the PIQ includes information that is stored when that processing request is queued at the PIQ.

The AM may read the processing request from the selected PIQ in any suitable manner. In one embodiment, the AM reads the processing request by reading a current read pointer of the selected one of the PIQs. In one embodiment, in which the PIQs are implemented as FIFO queues, the current read pointer is the first read pointer in the PIQ. The AM may increment the read pointer for the PIQ either before or after reading the processing request (depending on the implementation).

In one embodiment, the AM changes the status of the PIQ from WAITING to BUSY after reading the processing request from the PIQ.

At step 410, the AM determines the NIP of the processing request (i.e., the NIP from which that processing request was originally received). The AM determines the NIP from the processing request read from the selected PIQ. The NIP may be identified from a CPU-ID included in the processing request read from the selected PIQ.

At step 412, the AM generates a processing notice for the processing request read from the selected PIQ.

The processing notice is adapted for being propagated to the NIP associated with the processing request read from the selected PIQ.

The processing notice includes the protocol instance of the protocol message to be processed. The AM may determine the protocol instance to include in the processing notice either from a protocol instance identifier included in the processing request read from the PIQ or from a protocol instance identifier assigned to the PIQ (e.g., from a PIQ-ID of the protocol instance).

At step 414, the AM propagates a processing notice to the NIP that is associated with the processing request read from the selected PIQ (i.e., the NIP having an associated CPU-ID that is the same as the CPU-ID included in the processing request read from the selected PIQ). The AM may propagate the processing notice to the NIP in any suitable manner.

At step 416, the NIP to which the processing notice is propagated receives the processing notice.

In one embodiment, upon receiving the processing notice, the NIP may send an acknowledgement to the AM to acknowledge receipt by the NIP of the processing notice. In one such embodiment, the AM changes the status of the PIQ from WAITING to BUSY upon receiving the acknowledgement from the NIP.

At step 418, the NIP determines the protocol instance of the received processing notice. The protocol instance of the received processing notice is determined based on information included within the processing notice (i.e., from a protocol instance identifier included within the processing notice).

At step 420, the NIP retrieves the next protocol message associated with the protocol instance that is identified in the processing notice.

The NIP retrieves the next protocol message associated with the protocol instance from storage (e.g., from the NIM that stores protocol messages for that NIP).

For example, where the NIM includes message queues for the protocol instances, the message queue associated with the protocol instance is identified and the protocol message at the front of the identified message queue is read from the front of the identified message queue.

For example, where the NIM does not include message queues for the protocol instances, the NIP searches the stored protocol messages to find the protocol message having associated therewith: (1) an identifier of the associated protocol instance and (2) an oldest timestamp.

At step 422, the NIP processes the next protocol message associated with the protocol instance.

The processing of the protocol message may include any processing which may be performed for a protocol message, which may vary depending on the type of protocol of the protocol message to be processed, the type of protocol message to be processed, and like factors.

The processing may include local processing, i.e., processing on the NI or other component that houses the NIP, as well as between elements of the NI or other component that houses the NIP, such as other hardware and/or software components associated with the NI or other component that houses the NIP.

The processing may include distributed processing, including inter-NIP communications. For example, the NIP that processes the protocol message may inform each of the other NIPs regarding the processing of the protocol message. This may be used, for example, to ensure that each NIP has a current view of the state of the protocol at each of the other NIPs based on distributed processing of protocol messages for different protocol instances across multiple NIPs.

At step 424, a determination is made as to whether processing of the protocol message is complete. The completion of processing of the protocol message includes completion of any local processing by the NIP, completion and acknowledgment of all inter-NIP communications, and completion of any other activities associated with processing of the protocol message.

If processing of the protocol message is not complete, method 400 remains at step 424, such that processing of the protocol message may continue to completion. If processing of the protocol message is complete, method 400 proceeds to step 426.

At step 426, the NIP generates a processing acknowledgement for the processing notice. The processing acknowledgment indicates that processing of the protocol message in response to the processing notice is complete.

The processing acknowledgement may be a simple acknowledgement that processing of the protocol message for the selected protocol instance. is complete, or may be a more detailed acknowledgement including additional information indicative of the results of the processing of the protocol message.

At step 428, the NIP propagates the processing acknowledgement to the AM. The processing acknowledgement may be propagated in any suitable manner.

At step 430, the AM receives the processing acknowledgement from the NIP.

At step 432, the AM clears the processing request from the selected PIQ from which the processing request was read.

At step 434, the AM determines whether the state of the selected PIQ from which the processing request was read. The determination of the state of the selected PIQ includes determining whether the selected PIQ has any additional processing requests queued therein.

At step 436, the AM updates the status of the selected PIQ from BUSY to either EMPTY (if the PIQ is empty) or WAITING (if the PIQ has additional processing requests queued therein).

From step 436, method 400 returns to step 404, at which point a next PIQ is selected to be serviced.

As depicted in FIGS. 4A and 4B, method 400 continues to operate to service the PIQs using the NIPs, such that the protocol messages of the different protocol instances continue to be processed atomically. In one embodiment, method 400 continues to run such that the PIQs are serviced continually. The PIQs may be serviced in any suitable order, e.g., in a round-robin fashion or using any other manner of cycling through the PIQs for servicing the PIQs to enable atomic processing of protocol messages for multiple protocol instances.

As described herein with respect to FIG. 3 and FIGS. 4A and 4B, information is propagated between the AM and the NIPs in order to provide the protocol message processing functions depicted and described herein.

The propagation of information between the AM and the NIPs may be performed using any suitable messaging or signaling formats.

The propagation of information between the AM and the NIPs may be performed using any suitable communication paths, e.g., via one or more hardware buses and/or other suitable communication means. For example, propagation of information between the AM and the NIPs may be direct or indirect (e.g., via other hardware devices disposed on the respective NIs and/or associated with the NIPs, via one or more other modules on which the NIPs may be disposed, and the like, as well as various combinations thereof). In other words, the protocol message processing functions depicted and described herein are not intended to be limited to any particular means by which communications between the AM and the NIPs is performed.

Although primarily depicted and described herein with respect to processing protocol messages for a single protocol having multiple protocol instances, the protocol message processing functions depicted and described herein may be utilized to process protocol messages for multiple protocols each having multiple protocol instances. In this case, a communication node may be configured in any suitable manner for supporting multiple protocols, e.g., using a single arbiter module for handling multiple protocols, using multiple arbiter modules for handling multiple protocols (e.g., each arbiter module dedicated to a different protocol), and the like.

Although primarily depicted and described herein with respect to processing protocol messages, the protocol message processing functions depicted and described herein may be utilized to process various other types of messages (e.g., for processing user messages for which atomic processing is required or desired, and/or for processing any other types of messages for which atomic processing is required or desired).

Although primarily depicted and described herein with respect to processors and an arbiter implemented within a communication node, the protocol message processing functions depicted and described herein may be utilized for sharing access to different instances of a protocol in various other types of elements implementing various other types of functions. In such embodiments, the processors to which access is arbitrated may include other types of processors (i.e., not network interface processors associated with respective interfaces to a network).

Figure 5:
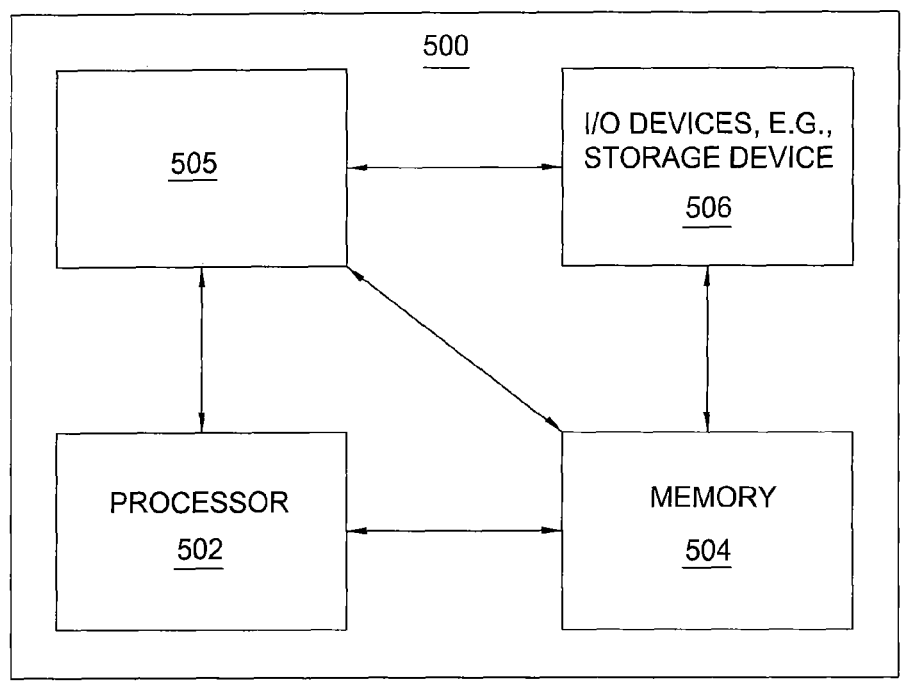
FIG. 5 depicts a high-level block diagram of a general-purpose computer suitable for use in performing the functions described herein.

FIG. 5 depicts a high-level block diagram of a general-purpose computer suitable for use in performing the functions described herein. As depicted in FIG. 5, system 500 comprises a processor element 502 (e.g., a CPU), a memory 504, e.g., random access memory (RAM) and/or read only memory (ROM), a message processing module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, a message processing process 505 can be loaded into memory 504 and executed by processor 502 to implement the functions as discussed above. As such, message processing process 505 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for controlling processing of messages for a plurality of protocol instances, comprising:
  receiving a plurality of messages having respective associations with at least one of the protocol instances and being for a plurality of processors;
  generating a plurality of processing requests based on the plurality of messages, the plurality of processing requests identifying the protocol instances associated with the respective plurality of messages;
  queuing the plurality of processing requests in a plurality of queues based on the identified protocol instances associated with the respective plurality of processing requests, the plurality of queues being assoiciated with the respective plurality of protocol instances; and
  servicing the plurality of queues in a manner for arbitrating access by the plurality of queues to the plurality of processors for processing the plurality of messages, the servicing of the queues comprising:
    identifying a first queue of the plurality of queues having at least one processing request queued therein;
    reading a first processing request from the first queue of the plurality of queues;
    determining a first processor of the plurality of processors associated with the first processing request, the first processing request being associated with a first protocol instance of the plurality of protocol instances; and
    initiating processing by the first processor of a first message associated with the first protocol instance identified by the first processing request.

2. The method of claim 1, wherein receiving the plurality of messages comprises:
  receiving the messages at a plurality of network interfaces associated with the respective plurality of processors.

3. The method of claim 1, wherein the plurality of processors have associated therewith a respective plurality of memories, comprising respective pluralities of message queues associated with the respective plurality of protocol instances, the method further comprising:
  queuing the plurality of messages using respective ones of the message queues of respective ones of the memories based on the respective ones of the plurality of processors with which the messages are associated and the respective ones of the plurality of protocol instances with which the messages are associated.

4. The method of claim 1, wherein generating the plurality of processing requests for the respective plurality of messages comprises:
  determining the respective ones of the plurality of protocol instances with which the messages are associated;
  determining a respective plurality of processor identifiers of the respective plurality of processors for which the messages are received; and
  generating the plurality of processing requests for the respective plurality of messages, the plurality of processing requests comprising the respective plurality of processor identifiers, the plurality of processing requests for being directed to respective ones of the plurality of queues associated with respective ones of the plurality of protocol instances with which the respective messages are associated.

5. The method of claim 1, wherein the processing requests are propagated from the respective ones of the processors at which the respective messages are received to an arbiter module maintaining the queues.

6. The method of claim 1, wherein queuing the plurality of processing requests comprises:
  determining the respective ones of the plurality of protocol instances with which the processing requests are associated; and
  writing the plurality of processing requests to respective ones of the plurality of queues based on the respective ones of the plurality of protocol instances with which the respective processing requests are associated.

7. The method of claim 1, wherein identifying the first queue of the plurality of queues having at least one processing request queued therein comprises:
  selecting the first queue of the plurality of queues;
  determining a queue status associated with the first queue of the plurality of queues; and
  identifying the first queue based on a determination that the first queue has an associated status of WAITING.

8. The method of claim 1, wherein initiating processing by the first processor of the first message associated with the first protocol instance identified by the first processing request comprises:
  generating a processing notice for the first processing request, wherein the processing notice identifies the first protocol instance with which the first processing request is associated; and
  propagating the processing notice to the first processor with which the first processing request is associated.

9. The method of claim 8, further comprising:
  receiving the processing notice at the first processor with which the first processing request is associated;
  determining, from the processing notice, the first protocol instance with which the first processing request is associated; and
  processing the first message associated with the first protocol instance identified by the first processing request.

10. The method of claim 9, further comprising:
  clearing the first processing request from the first queue from which the first processing request was read;
  determining a state of the first queue from which the first processing request was read;
  updating a status of the first queue from which the first processing request was read based on the state of the first queue; and
  selecting a next one of the plurality of queues to be serviced.

11. An apparatus for controlling processing of messages for a plurality of protocol instances, comprising:

a plurality of processors configured for:
receiving a plurality of messages having respective associations with at least one of the protocol instances; and
generating a plurality of processing requests based on the plurality of messages, the plurality of processing requests identifying the protocol instances associated with the respective plurality of messages; and
an arbiter module communicatively connected to the plurality of processors, the arbiter module comprising a plurality of queues associated with the respective plurality of protocol instances, the arbiter module configured for:
queuing the plurality of processing requests in respective ones of the queues based on the identified protocol instances associated with the respective plurality of processing requests; and
servicing the plurality of queues in a manner for arbitrating access by the plurality of queues to the plurality of processors for processing the plurality of messages, the servicing of the queues comprising:
identifying a first queue of the plurality of queues having at least one processing request queued therein;
reading a first processing request from the first queue of the plurality of queues;
determining a first processor of the plurality of processors associated with the first processing request, the first processing request being associated with a first protocol instance of the plurality of protocol instances; and
initiating processing by the first processor of a first message associated with the first protocol instance identified by the first processing request.

12. The apparatus of claim 11, further comprising:
a plurality of network interfaces associated with the respective plurality of processors, the plurality of network interfaces configured to receive the plurality of messages.

13. The apparatus of claim 11, further comprising:
a plurality of memories associated with the plurality of processors,
the plurality of memories comprising respective pluralities of message queues associated with the respective plurality of protocol instances, the respective pluralities of message queues configured to queue the plurality of messages based on the respective ones of the plurality of processors with which the messages are associated and the respective ones of the plurality of protocol instances with which the messages are associated.

14. The apparatus of claim 11, wherein the processors are configured for generating the plurality of processing requests by:
determining respective ones of the plurality of protocol instances with which the messages are associated;
determining a respective plurality of processor identifiers of the respective plurality of processors for which the messages are received; and
generating the plurality of processing requests for the respective plurality of messages, the plurality of processing requests comprising the respective plurality of processor identifiers, the plurality of processing requests for being directed to respective ones of the plurality of queues associated with respective ones of the plurality of protocol instances with which the respective messages are associated.

15. The apparatus of claim 11, wherein the processors are configured for propagating the plurality of processing requests to the arbiter module.

16. The apparatus of claim 11, wherein the arbiter module is configured for queuing the plurality of processing requests by:
determining the respective ones of the plurality of protocol instances with which the respective processing requests are associated; and
writing the plurality of processing requests to respective ones of the plurality of queues based on the respective ones of the plurality of protocol instances with which the respective processing requests are associated.

17. The apparatus of claim 11, wherein the arbiter module is configured for identifying the first queue of the plurality of queues having at least one processing request queued therein by:
selecting the first queue of the plurality of queues;
determining a queue status associated with the first queue of the plurality of queues; and
identifying the first queue based on a determination that the first queue has an associated status of WAITING.

18. The apparatus of claim 11, wherein the arbiter module is configured for initiating processing by the first processor of the first message associated with the first protocol instance identified by the first processing request by:
generating a processing notice for the first processing request, wherein the processing notice identifies the first protocol instance with which the first processing request is associated; and
propagating the processing notice to the first processor with which the first processing request is associated.

19. The apparatus of claim 18, wherein the first processor is configured for:
receiving the processing notice at the first processor with which the processing request is associated;
determining, from the processing notice, the first protocol instance with which the first processing request is associated; and
processing the first message associated with the first protocol instance identified by the first processing request.

20. The apparatus of claim 19, wherein the arbiter module is configured for:
clearing the first processing request from the first queue from which the first processing request was read;
determining a state of the first queue from which the first processing request was read;
updating a status of the first queue from which the first processing request was read based on the state of the first queue; and
selecting a next one of the plurality of queues to be serviced.

21. A non-transitory computer readable storage medium storing a software program which, when executed by a computer, causes the computer to perform a method for controlling processing of messages for a plurality of protocol instances, the method comprising:
receiving a plurality of messages having respective associations with at least one of the protocol instances and being for a plurality of processors;
generating a plurality of processing requests based on the plurality of messages, the plurality of processing requests identifying the protocol instances associated with the respective plurality of messages;
queuing the plurality of processing requests in a plurality of queues based on the identified protocol instances associated with the respective plurality of processing requests, the plurality of queues being associated with the respective plurality of protocol instances; and servicing the plurality of queues in a manner for arbitrating access by the plurality of queues to the plurality of processors for processing the plurality of messages, the servicing of the queues comprising:

identifying a first queue of the plurality of queues having at least one processing request queued therein;

reading a first processing request from the first queue of the plurality of queues;

determining a first processor of the plurality of processors associated with the first processing request, the first processing request being associated with a first protocol instance of the plurality of protocol instances; and initiating processing by the first processor of a first message associated with the first protocol instance identified by the first processing request.

\* \* \* \* \*